Patented Jan. 19, 1926.

1,569,956

UNITED STATES PATENT OFFICE.

LARS FLODQUIST, OF STOCKHOLM, AND INGE GUSTAFSSON BLOMQUIST, OF STOCKSUND, SWEDEN, ASSIGNORS TO AKTIEBOLAGET PHARMACIA, OF LILJEHOLMEN, STOCKHOLM, SWEDEN, A JOINT-STOCK COMPANY LIMITED OF SWEDEN.

METHOD OF PRODUCING A PHARMACEUTICAL PREPARATION AND A PHARMACEUTICAL PREPARATION THUS PRODUCED.

No Drawing. Application filed September 20, 1923. Serial No. 663,802.

*To all whom it may concern:*

Be it known that we, LARS FLODQUIST, doctor, subject of the King of Sweden, and resident of Engelbrektsplan 2, Stockholm, in the Kingdom of Sweden, and INGE GUSTAFSSON BLOMQUIST, pharmaceutical chemist, subject of the King of Sweden, and resident of Morby, Stocksund, in the Kingdom of Sweden, have invented certain new and useful Improvements in a Method of Producing a Pharmaceutical Preparation and a Pharmaceutical Preparation thus Produced; and we do hereby declare the following to be a full, clear, and exact description of the invention, such as will enable others skilled in the art to which it appertains to make and use the same.

The present invention has for its object to produce a pharmaceutical preparation especially adapted to be used as an anodyne and remedy for otitis.

The invention is based on the principle that a concentrated solution of a high osmotic pressure is produced, the solution being prevented from crystallizing by adding certain substances suitable for the purpose, said solution serving as a bearer of antiseptics and anæsthetics mixed therein and being able to pass through a semipermeable film, such as the tympanum, thus acting as a disinfectant on the nest of disease as well as a lenitive.

The concentrated solution which acts as the bearer of the antiseptic and anæsthetic substances with a high osmotic pressure consists of a solution of monosaccharides. Oxybenzols may be used as antiseptics and alkaloids or similar substances resembling alkaloids as to their lenitive properties may be used as anæsthetics.

In our preferred practice of the invention we employ a mixture or dextrose and levulose to which are added appropriate amounts of antiseptics and anæsthetics.

The dextrose is mixed with so much of the levulose, which has a syrupy consistency, that no crystallization takes place at a temperature of about $+10°$ Celsius. To the mixture a small quantity of water is added so that a transparent solution is obtained which is filtered to separate any existing impurities. To the transparent filtrate the constringent principle of the suprarenal gland is added, for instance a water solution of suprarenin or adrenalin, and then an anæsthetic substance is added to the said mixture, for instance cocaine (benzoyl-ecgoninmethylester). Then antiseptic substances are added, such as isoamylhydrocuprein and phenols or cresols, dissolved in water. This solution is further filtered and sterilized in a suitable way and is thereafter ready to be used for the remedy of acute otitis.

As an example, the following proportions are preferably used for producing the preparation according to this invention. 50 parts by weight of pure dextrose and 10 parts by weight of levulose are mixed with enough water to produce a solution, which is semifluid at a common inside temperature. Then 20 parts by weight of a solution of adrenalin is added, which solution contains 1 part of adrenalin to 1000 parts of water. In the solution thus obtained after adding the last-named solution 10 parts by weight of cocaine is dissolved, whereupon 0.75 parts by weight of isoamylhydrocuprein is added after it has been dissolved in a required quantity of hot water and, lastly, one part by weight of phenol (or a corresponding quantity of cresol) is added, dissolved in so much water that the entire mixture contains 100 parts by weight. The solution is filtered in a vacuum filter and then subjected to sterilizing. It is to be understood that the proportions between the various ingredients can be varied somewhat and also that other more or less inert substances can be used to advantage without departing from the spirit of the invention.

The product obtained according to the example given above will contain the following:—50 parts by weight of dextrose, 10 parts by weight of levulose, 0.02 parts by weight of adrenalin, 10 parts by weight of cocaine, 0.75 parts by weight of isoamylhydrocuprein, 1.0 parts by weight of phenol (or a corresponding quantity of cresol), 28.23 parts by weight of water.

Having thus described our invention we declare that what we claim is:

1. A method of producing a pharmaceutical preparation which comprises adding about 50 parts by weight of dextrose mixed with about 10 parts by weight of levulose to a sufficient quantity of water to obtain a semi-fluid solution at common inside temperature, thereafter adding to said solution about 20 parts by weight of adrenalin solution containing 1 part by weight of adrenalin in about 1000 parts by weight of water, dissolving in the solution 10 parts by weight of cocaine, adding 0.75 parts by weight of isoamylhydrocuprein dissolved in water as 1 part by weight of phenol or a corresponding quantity of cresol is added, whereupon water is added in such an amount that the whole mixture contains 100 parts by weight.

2. A pharmaceutical preparation consisting of about 50 parts by weight of dextrose, 10 parts by weight of levulose, 0.02 part by weight of adrenalin, 10 parts by weight of cocaine, 0.75 part by weight of isoamylhydrocuprein, 1 part by weight of phenol, and 28.23 parts by weight of water.

In witness whereof we have hereunto set our hands.

LARS FLODQUIST.
INGE GUSTAFSSON BLOMQUIST.